Sept. 20, 1966  B. H. KAMENS  3,274,473
STARTING AND DAMPING CIRCUITRY FOR A
TRANSISTORIZED GOVERNING SYSTEM
Filed Aug. 13, 1963
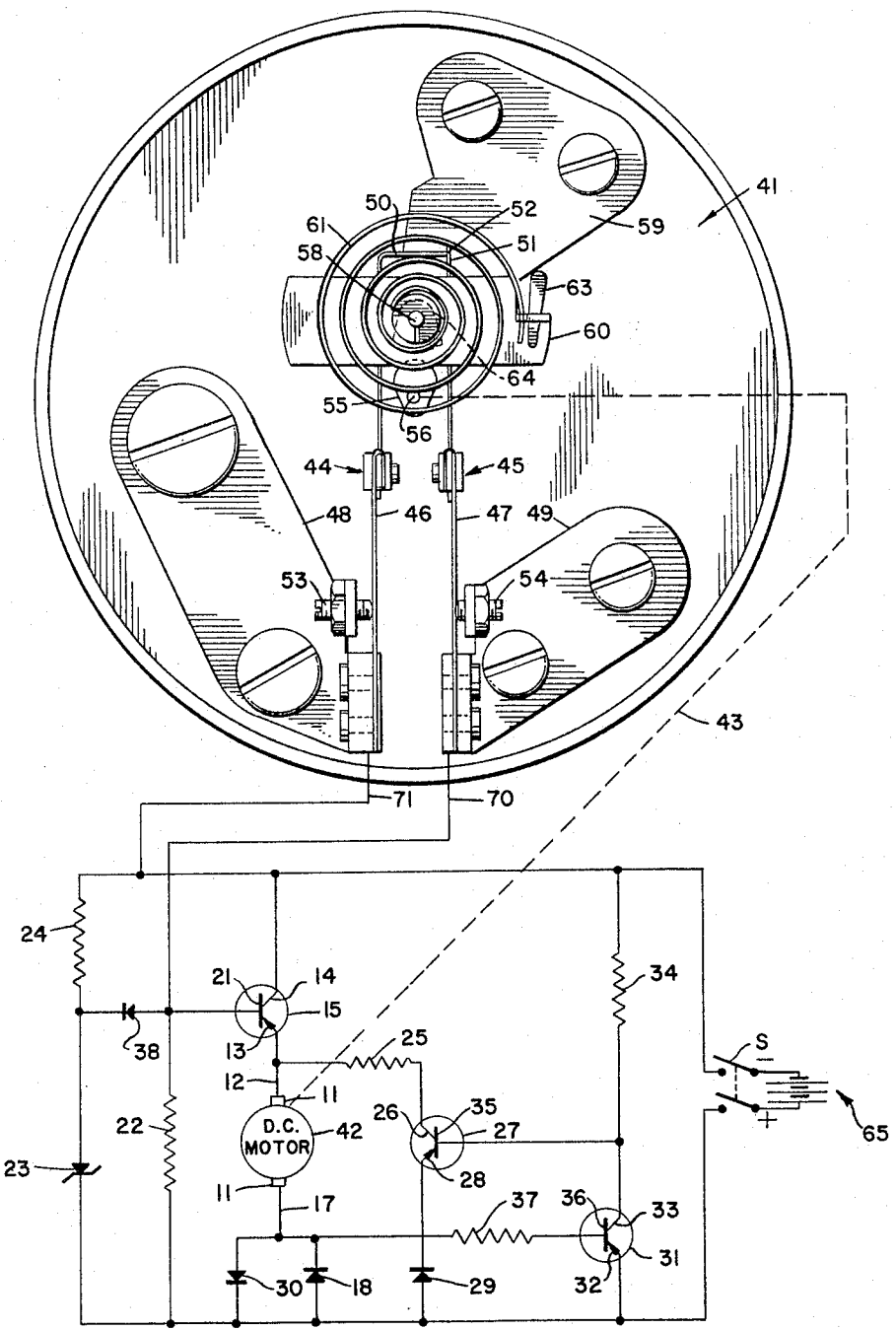
INVENTOR.
BRUCE H. KAMENS
BY Mandeville & Schweitzer
ATTORNEYS United States Patent Office 3,274,473
Patented Sept. 20, 1966

3,274,473
STARTING AND DAMPING CIRCUITRY FOR A TRANSISTORIZED GOVERNING SYSTEM
Bruce H. Kamens, Thomaston, Conn., assignor to Consolidated Electronics Industries Corp., Waterbury, Conn., a corporation of Delaware
Filed Aug. 13, 1963, Ser. No. 301,735
10 Claims. (Cl. 318—311)

The present invention relates to motor control systems, and more particularly to new and improved electronic damping and electronic failsafe starting circuitry for use with governed electric motors.

The present invention is of particularly utility in so-called "chronometrically" governed motors of the type having the power supply to the motor pulsed by the action of a pair of electrical contacts openable and closable periodically. Speed control of this type motor is achieved by applying power pulses at full line voltage to the motor being governed at intervals controlled by a constant frequency device such as a balence wheel and escapement mechanism. The duration of the regularly applied pulses, the "on" or "duty" portion of the pulse cycle, is determined by a phase relation between the motor speed and the constant frequency device. This approach to motor speed control has proved to be most advantageous for many timing applications and is described at length and in more detail in the United States Patents Nos. 2,523,298 and 2,740,080, issued to A. W. Haydon.

In contrast with centrifugal type governors which open governing contacts only in an overspeed condition and close governing contacts in an underspeed condition, the governing contacts of a chronometric governor are opened and closed at a fixed frequency. In the latter type of governor, governing is obtained by controlling the pulse duration (by the phase relation) while maintaining the pulse frequency constant (by a balance wheel and escapement mechanism). Thus, in chronometric governing, under conditions of light loading and/or high supply voltage, the duty cycle (duration) of the power pulse would normally be very small. It has been found that, when a chronometrically governed motor is operating at a minimum duty cycle, it may tend to overspeed into a runaway condition, if the average governed speed is significantly exceeded during the minimum "on" portion of the pulse cycle and if the motor speed does not decrease sufficiently in the "of" portion of the pulse cycle to maintain the average governed speed.

In accordance with one aspect of the invention, the governing range of a chronometrically governed motor may be greatly extended by electrically loading the motor when the duty cycle is small and by decreasing this electrical loading when the duty cycle is large. In other words, the motor is electrically loaded when the governor contacts are open, in the "off" portion of the pulse cycle, and is then electrically unloaded in the duty portion of the pulse cycle. Thus, during maximum mechanical loading of the motor, necessitating a long duty cycle, the electrical loading of the motor will be relatively small. Conversely, during conditions of light mechanical loading of the motor, the electrical loading will be relatively large because of its application for a greater percentage of the pulse cycle.

When unusually transient conditions of mechanical load and supply voltage occur in the operation of conventional, chronometrically governed motors, there may be a tendency for the motor to "hunt" as it seeks to establish a new equilibrium duty cycle. In accordance with the principles of the invention, the above-described new system of electrically loading the motor during the "off" portion of the pulse cycle tends to dampen such "hunting" oscillations. Moreover, this electrical damping, unlike internal viscous damping, may be very closely controlled to increase the motor efficiency, especially under conditions of maximum mechanical load.

In accordance with one aspect of the invention, a "loading" resistor, in series with a normally non-conducting "damping" transistor, is placed across the armature of a chronometrically governed motor. The "damping" transistor is biased in such a manner that it is rendered conductive, to place the "loading" resistor in series with the armature, only when the governor contacts are open (during the "off" portion of the pulse cycle) to dissipate the generated back E.M.F., and thereby to load electrically and to dampen the motor. The "damping" transistor is rendered non-conductive effectively to remove the "loading" resistor from the motor circuit when the governor contacts are closed (during the duty cycle or "on" portion of the pulse cycle). Thus, the "loading" resistor is kept out of the supply circuit when the motor is being energized and causes no drain on the energizing source, usually a D.C. battery.

Selective exclusion of the "loading" resistor from the supply circuit, in accordance with the principles of the invention, minimizes power supply dissipation in the resistor and is achieved by using a sensing circuit in one leg of the motor supply crcuit to detect opening of the governing contacts through the reversal of the armature current. The sensing circuit appropriately biases a "control" transistor which renders the "damping" transistor conductive at desired times to place the resistor across the motor armature for damping and electrical loading purposes. Thus, the new circuitry provides for simplified and reliable electronic damping and loading of the motor, permitting extension of its governing range, yet causes no drain on the motor power supply attributable to the shunt resistor.

In accordance with another specific aspect of the invention, novel and improved "failsafe" starting circuitry is provided to start the motor under all conditions of load, supply voltage, and ambient temperature, in the event of open or contaminated governor contacts. Specifically, an auxiliary or "failsafe" starting control voltage having a value less than the generated back E.M.F. of the motor at governed speed is supplied to control a motor-switching power transistor when the governor contacts are open. Since the auxiliary control voltage is kept below the back E.M.F. at governing speed, it will have no effect on the operation of the motor-switching transistor once the governing speed has been attained, but it will reliably assure that adequate starting voltage is available for "open circuit" start-up.

The auxiliary starting voltage reference advantageously is a zener diode, the operating characteristics of which are such that it provides a constant control voltage available to the motor-switching transistor when the governor contacts are open. Since the auxiliary control voltage supplied to the transistor is less than the counter E.M.F. generated by the motor at governed speeds, the auxiliary voltage will not render the transistor conductive to supply current to the motor during operation at governed speeds. Hence, the failsafe voltage will not affect the operation of the motor at governed speeds, yet it will advantageously insure reliable starting, in the event the governor contacts are open or contaminated, by providing high starting voltage to the motor.

To understand more completely the nature of the present invention, reference should be made to the following detailed description taken in conjunction with the accompanying drawing which schematically illustrates motor control circuitry embodying the principles of the invention.

For the purposes of illustrating the invention, it has been shown embodied in combination with a "chronometric" governor as described and claimed in the Haydon Patent No. 2,740,080. Only so much of that mechanism as is necessary to a full understanding of this invention will be described herein, and the reader is directed to the patent for a more complete description.

As shown in the drawing, a base plate 41 has assembled thereon principal parts of a governor mechanism. This plate typically is mounted directly on the end of the housing of the motor, the speed of which is to be governed. So that the invention may be fully understood, the motor is shown schematically at 42 and its driving connection to the governor mechanism is indicated by the broken line 43. As actually constructed, however, the motor and the governor mechanism are preferably contained within the same housing.

The governor mechanism includes a pair of spring contact elements 44 and 45 which comprise, respectively, leaf spring members 46 and 47 which are separately mounted and electrically insulated from each other by means of mounting brackets 48 and 49 which are secured to the base plate. An L-shaped contact member 50 is fixed to the free end of spring member 46 and a straight contact member 51 is fixed to the free end of spring member 47. The spring contact elements 44 and 45 are so positioned that extension members 50 and 51 are normally urged into contact with each other at their free ends. This contact between the members occurs at 52. Suitable adjusting screws 53 and 54 are threaded into the brackets 48 and 49, respectively, and bear on the springs 46 and 47. These are provided for adjusting the contact pressure.

A cam 55 is mounted on a shaft 56 which is rotatably driven by the motor 42, either directly from the output shaft of the motor or through a suitable train of gears. The cam 55 is positioned between the spaced, parallel portions of the contact members 50 and 51 of spring contact elements 44 and 45.

As the cam 55 is rotated by the motor shaft 56, the lobe of the cam alternately engages the contact member 50 and then the contact member 51; however, the maximum displacement of the cam lobe is such that the displacement which it imposes on either of the contact members 50 or 51 is not sufficient by itself to cause a separation or break at the contact point 52.

A constant speed device, or, more precisely, a constant frequency device, drives a cam which cooperates with the rotating cam 55 to effect controlled opening and closing of the contact members 50 and 51. This device includes a shaft 58 journaled at its lower end in the bracket 59 which is bolted onto the plate 41. The shaft extends out of the plane of the drawing and is so positioned that it is between the contact members 50 and 51. An inertial member which may be a clockwork-type balance wheel, or more simply and equally satisfactory for this purpose, an elongated rectangular bar 60 is fixed to the shaft 58. A helical hairspring 61 is anchored at one end, while the other end of the spring is attached to the balance member radially outward from its center by means of a wedge 63 which frictionally secures the spring in a slot in the bar. The combination of the rotatably mounted balance member and the spring forms an oscillating system having a predetermined constant frequency.

A cam 64 is fixed to the balance member 60 to oscillate therewith. This cam, like cam 55, is arranged to engage alternately the contact members 50 and 51. It is noted that the centers of rotation of both cams 55 and 64 lie on a line normally midway beween the spring contact elements 50 and 51, and, as explained in greater detail in the Haydon patent referred to above, the maximum throw of the cam 64 relative to the maximum throw of the motor driven cam 55 should be such that when either of the contact elements is displaced to the maximum extent by the motor driven cam 55, the cam 64 may pass freely to and through its position of maximum displacement. In other words, the maximum throw on the motor driven cam 55 should be slightly greater than the maximum throw on the cam 64. This condition obtains when the cams are in phase and, as explained above, the contact members 50 and 51 will not break at 52. On the other hand, when the cams are out of phase so that one cam engages the contact member 50 while the other cam engages the member 51, the contact members are momentarily held apart and a break occurs at 52.

The frequency of oscillation of the balance member 60 and cam 64 is made such that, in cooperation with the period of rotation of the cam 55, the contact members 50 and 51 are open at 52 whenever the rotational speed of the cam 55 and hence the rotational speed of the motor exceeds some predetermined speed.

As previously explained, the motor driving the cam 55 through the mechanical connection 43 is schematically indicated at 42. Power for the motor is provided by means of the battery 65 or any other suitable D.C. source, and it must be generally sufficient to cause the motor to run at some speed greater than the predetermined desired speed if the motor were not otherwise controlled.

In the illustrated system, the D.C. motor 42 is, for example, of the type having a permanent magnet field and wound rotor such as disclosed in the United States patent to A. W. Haydon, No. 2,513,410. One of the brushes 11 of the motor is connected by a conductor 12 through the emitter electrode 13 and the collector electrode 14 of a "governing" transistor 15 to the negative side of the D.C. power source 65. The other motor brush is connected by a conductor 17 through a "sensing" rectifier 18 to the positive side of the power source. Advantageously, a switch "S" may be included in series with the power source and the motor.

The pair of chronometrically controlled governor switch contacts 50, 51 are connected across the base electrode 21 and the collector electrode 14 of the "governing" transistor by conductors 70 and 71. The governor contact 51 and the transistor base electrode 21 are connected to the positive side of the power source through a "biasing" resistor 22. As will be understood, the governor contacts are adapted to be closed at regular intervals by the constant speed device and to be opened in response to the instantaneous speed of the motor to bias the governing transistor 15 into conductive and nonconductive states, respectively. When the transistor 15 is conductive, a relatively high current will flow through the motor 42 to cause it to accelerate, whereas, when the governor contacts 50, 51 are opened, the transistor 15 is biased into a non-conductive state and acts as a relatively great resistance allowing only a minimal current to be supplied to the motor allowing it to coast and decelerate. This particular circuitry reduces greatly the current flow through the governor contacts 50, 51 greatly prolonging their life.

With the above-mentioned circuitry alone, starting of the motor 42 may be subject to unreliabilities, with the governor contacts 50, 51 opened or with dirty or contaminated governor contacts, even though the contacts are of a self-cleaning type. Accordingly, it has been proposed in conventional governing circuits to connect a shunt resistor, for example, across the governor contacts to supply some minimal current to the armature when the contacts are open. This arrangement has not been entirely satisfactory, for highly reliable motor starting requires substantial armature current. Thus, if the conventional governor shunt resistor is of low enough resistance to accommodate a substantial starting current, the difference between the conditions of open and closed governor contacts will be very small. Hence, the effective range of governing of conventinonal governors with a small shunt resistor across the governor contacts will be substantially reduced. On the other hand, merely increasing the size of the conventional governor contact shunt resistor is not a satisfactory way to avoid this limitaiton, for the increase in size will will reduce the starting current available to the armature under "open circuit" conditions and significantly reduce the reliability of starting.

In accordance with the principles of the invention, new and improved "failsafe" circuitry is provided to assure reliable starting of the motor under all conditions of load, supply voltage, and ambient temperature, in the event the contacts are open due to contamination or otherwise and to overcome the limitations of the conventional circuitry recited hereinabove. Specifically, a three-part circuit, containing a Zener diode 23 in one leg, a resistance 24 in another leg, and a rectifier 38 in the third leg, is connected to the governed motor circuit so that the resistance leg and the rectifier leg are placed across the governor contacts 50, 51, while the Zener diode leg and rectifier leg are connected between the governor contact 51 and the resistor 24; the resistance leg is connected to the other governor contact 50; and the Zener diode leg is connected to the positive side of the D.C. source, as clearly shown in the drawing.

It will be appreciated that the Zener diode 23 and the resistor 24 act as a special voltage divider. The parameters of the Zener diode are appropriately selected so that the voltage drop across it, less that across the rectifier 38 and the base-to-emitter drop in the transistor 15, is less than the counter E.M.F. generated by the motor at the governed speed, and the resistance of the resistor 24 is of sufficient magnitude to minimize drain on the power source. In accordance with the principles of the invention, when the governor contacts 50, 51 are open and the motor is at rest, the drop across the Zener diode 23, which functions as an auxiliary voltage reference, will provide sufficient bias to cause the transistor 15 to become conductive to allow a substantial current to be delivered to the motor armature to start the motor. Advantageously, the use of a Zener diode provides a substantially constant reference voltage even though the source voltage may be reduced through discharge of the battery 65, for example.

When the motor 42 reaches the governing speed, the generated counter E.M.F., in accordance with the principles of the invention, will exceed the drop across the Zener diode and will place a reverse bias on the transistor 15. Thus, when the governor contacts are open, the voltage of the reference voltage will not be effective in the operation of the motor at governing speeds. Since the Zener diode has a substantially constant voltage drop thereacross, which is substantially unaffected by a diminution of the supply voltage, the circuit of the present invention provides highly reliable starting.

In accordance with another important aspect of the invention, a damping and loading system is provided for the governed motor which selectively places a shunt "loading" resistor across the motor armature when the governor contacts have been opened (during the "off" portion of the pulse cycle) and there has been a reversal of the armature current due to the generator action of the motor 42. To this end, a "loading" resistor 25 is connected at one side to the conductor 12 between the brush 11 and the governing transistor 15 and at the other side to the collector electrode 26 of a normally non-conductive "damping" transistor 27, which transistor functions as a normally open switch to keep the "loading" resistor effectively out of the motor supply circuit during the duty cycle, as will be explained hereinafter. The emitter electrode 28 of the damping transistor is connected in series with a rectifier 29 to the positive side of the D.C. source, while a rectifier 30 is connected in parallel relation with, but of opposite polarity to, the "sensing" rectifier 18.

The firing of the "damping" transistor 27 is controlled by a normally conductive "control" transistor 31. The emitter electrode 32 of the control transistor 31 is connected to the positive side of the D.C. source, the base 36 is connected through a resistor 37 to the "sensing" rectifier 18, and the collector 33 is connected in series with a resistor 34 to the negative side of the D.C. source. The base electrode 35 of the damping transistor 27 is connected between the resistor 34 and the collector electrode 33, as shown in the drawing.

In regular operation, the damping circuitry functions as follows: With the governor contacts closed for the duration of the duty cycle as determined by the motor travel, armature current will flow through the rectifier 18, and the small voltage drop over the rectifier will operate to bias the "control" transistor 31 into its normally conductive condition. With the transistor 31 conductive or "on," a non-conductive bias will be applied to the damping transistor 27, causing it to be shut "off" and to act as an open switch. Thus, with the governor contacts closed, the resistor 25 is effectively excluded from the supply circuit during the duty cycle and causes no drain on the source.

When the governor contacts are opened (during the "off" portion of the pulse cycle), and with the motor acting as a generator, there will be a reversal of the armature current which will cause the conductive bias to be removed from the rectifier 18, causing the control transistor 31 to become non-conductive or to be shut "off." This, in turn, will cause the damping transistor 27 to be conductively biased "on" to place the "loading" resistor 25 in series with the motor 10, the rectifiers 29, 30, and the emitter and collector electrodes of the transistor 27. Thus, the motor will be electrically loaded and damped by the dissipation of the generated current, as heat, in the "loading" resistor.

When the governor contacts are reclosed by the constant speed device (for the duty cycle), armature current is again reversed, causing the "sensing" rectifier 18 to bias the control transistor 31 "on," which, in turn, biases the damping transistor 27 "off" to remove the "loading" resistor from the supply circuit. The motor will then be energized during the duty cycle until the governor contacts are opened and the damping and loading system is re-activated.

In the illustrated, schematic circuit drawing, the governed motor 10 may be, for example, an A. W. Haydon Company "5700 Series" D.C. timing motor having an inconel rotor cage and an Alnico II B field magnet, which motor is energized by a source of 20–30 volts, in which case typical values for the resistors 24, 22, 25, 37, 34 are, respectively, 1200 ohms, 4700 ohms, 270 ohms, 10 ohms, and 3300 ohms. Typically, the rectifiers 18, 38, 29, 30, are semi-conductor diodes, all of the type 1N462A; the transistors 15, 27 and 31, are, respectively, type 2N1038, 2N1038, and 2N650; and the zener diode 23 is rated at 6.3 volts, ¼ watt.

The circuitry as described hereinabove, embodies, in accordance with the principles of the invention, means for ensuring highly reliable or "failsafe" starting of miniaturized, chronometrically governed D.C. motors. Moreover, the new "failsafe" circuit achieves its desired result without deleteriously affecting the governing ranges of such motors.

The new "damping and loading" circuitry disclosed along with the "failsafe" circuitry may be used in conjunction therewith or independently thereof. It will be appreciated that the damping and loading system extends the governing range of chronometrically governed motors without resorting to internal viscous damping, by artificially loading the motor in inverse proportion to its actual load, as reflected by the "on" and "off" portions of the duty cycle.

Although the present invention has been described with reference to a particular embodiment, it is to be understood that modifications may be made by persons skilled in the art without departing from the spirit or from the scope of the claims.

I claim:
1. A failsafe starting system for a D.C. motor having a pair of chronometrically controlled governor contacts for controlling the energization of the motor to maintain its speed at a predetermined value, comprising
(a) a D.C. source in series with said motor,

(b) governing means controllable by said chronometrically controlled contacts for varying the current supplied to said motor, (c) an auxiliary starting voltage means insuring a voltage to be supplied across the armature of the D.C. motor when said contacts are open, (d) said auxiliary voltage means having less effective E.M.F. than the back E.M.F. generated by said motor at said predetermined speed, (e) said auxiliary voltage therefore having effect during the starting of said motor when said contacts are open, but having no effect on the operation of said motor in the range of said predetermined value.

2. A starting system according to claim 1, in which (a) said governing means comprises a transistor having base, emitter, and collector electrodes, (b) said emitter and collector electrodes are connected in series with said motor and said source, (c) said governor contacts are connected to control the conductivity of said transistor.

(d) said auxiliary voltage means comprises a zener diode, (e) said zener diode causes said transistor to become conductive when said governor contacts are open and said motor has not attained said predetermined speed.

3. A failsafe starting system for a D.C. motor having a governing switch to maintain the speed of said motor at a predetermined value, comprising (a) a D.C. source in series with said motor, (b) auxiliary voltage means effective to start said motor when said governing switch is in a condition which allows insufficient starting current to be supplied to said armature, (c) said auxiliary voltage means having a magnitude less than the back E.M.F. generated at said predetermined speed, (d) whereby said auxiliary voltage has effect during starting of said motor but not during the operation of said motor at said predetermined speed.

4. A failsafe starting system according to claim 3, in which (a) said governing switch includes a transistor having emitter, collector and base electrodes and a pair of governor contacts, (b) said emitter and collector electrodes are in series with said motor, (c) said governor contacts are connected to control the conductivity of said transistor, and (d) said auxiliary voltage means includes a zener diode connected to said transistor for controlling the conductivity thereof when said contacts are open and said motor is at less than said predetermined speed.

5. An electrical loading system for a chronometrically governed D.C. motor having a pair of chronometric governor contacts for periodically energizing said motor, comprising (a) a D.C. source in a first series circuit with said motor for the periodic energization thereof, (b) a loading resistor in a second series circuit with said motor exclusive of said source forming a damping circuit, and (c) switch means in series with said damping circuit to open said damping circuit when said governor contacts are closed and to close said damping circuit when said governor contacts are open.

6. The system of claim 5, in which said switch means includes (a) sensing circuit means to detect a reversal of current in said motor upon the opening of said governing contacts, (b) normally non-conductive damping transistor means having an emitter electrode and a collector electrode in series with said damping circuit and having a base electrode connected to said sensing circuit, (c) said sensing circuit providing a sufficient bias upon opening of said contacts to render said transistor conductive to close said damping circuit.

7. The system of claim 6, in which said sensing circuit includes (a) a normally conductive control transistor means having a base, emitter and a collector electrode, (b) said control emitter electrode and collector electrode being connected in series with a biasing resistor and said source, (c) a first rectifier means in series with said motor and said source, (d) said first rectifier means also being in series with said base electrode and said emitter electrode, (e) second rectifier means connected across said first rectifier means and conducting in an opposite direction therefrom, (f) the voltage drop across said first rectifier means biasing said normally conductive control transistor means into a conductive state when said contacts are closed, (g) said control transistor being rendered non-conductive upon the reversal of current in said armature, (h) said control transistor upon becoming non-conductive causing a conductive bias to be placed on said damp transistor.

8. An electrical loading system for a motor chronometrically governed by pulses applied at a fixed frequency through an energizing circuit, the duty cycle of which pulses is determined by the travel of the motor, comprising (a) resistance means in a series damping circuit with said motor which damping circuit is independent of said energizing circuit, (b) switch means in series with said motor and said resistance means and automatically operable to open said damping circuit during said duty cycle.

9. A loading system according to claim 8, which includes (a) sensing circuit means detecting the condition of the governor contacts of said motor, (b) said sensing circuit means controlling said switch means.

10. A damping and loading system for a D.C. motor governed by a pair of chronometric governor contacts regularly closed at a fixed frequency and periodically openable at instants determined by the instantaneous motor speed including (a) sensing circuit means associated with said motor for detecting a change in the operating condition of the governor contacts of said motor, (b) damping and loading resistance means in a damping circuit with said motor for dissipating armature current when said governor contacts are open, and (c) selectively operable switch means rendering said damping and loading resistance means ineffective when said governor contacts are closed.

References Cited by the Examiner

UNITED STATES PATENTS

| | | | |
|---|---|---|---|
| 2,740,080 | 3/1956 | Haydon | 318—311 |
| 2,840,773 | 6/1958 | Kavanaugh et al. | 318—311 |
| 2,943,253 | 6/1960 | Lindgren | 318—325 |
| 3,013,196 | 12/1961 | Haydon | 318—311 |
| 3,143,695 | 8/1964 | Hohne et al. | 318—325 X |
| 3,184,671 | 5/1965 | Riggs | 318—325 |
| 3,187,126 | 6/1965 | De Barba | 318—311 |

ORIS L. RADER, *Primary Examiner.*

S. GORDON, J. C. BERENZWEIG, *Assistant Examiners.*